Nov. 24, 1964  D. W. UNDERWOOD  3,157,940
METHOD OF INSULATING AND RETAINING CONDUCTORS IN SLOTS
Filed April 6, 1961

INVENTOR.
DONALD W. UNDERWOOD
BY
Robert H. Montgomery
ATTORNEY

United States Patent Office 3,157,940
Patented Nov. 24, 1964

3,157,940
METHOD OF INSULATING AND RETAINING
CONDUCTORS IN SLOTS
Donald W. Underwood, Erie, Pa., assignor to General
Electric Company, a corporation of New York
Filed Apr. 6, 1961, Ser. No. 101,167
3 Claims. (Cl. 29—155.5)

This invention relates to stator insulation systems, and more particularly relates to insulation of open slot stators of dynamoelectric machines.

By open slot stators, reference is made to stators defining slots having no overhanging means for retaining top sticks and conductors therein. Generally, open slots are of substantially rectangular cross-sectional configuration having straight, substantially parallel side walls, although in some open slot stators there may be a very slight taper in the slot side wall. The use of an open slot stator in a dynamoelectric machine presents several advantageous features. It facilitates assembly of coil sides in the stator slots and decreases tooth-to-tooth flux leakage as compared to overhung or semi-closed stator slot design, and additionally where rectangular cross-section conductors are utilized, a high space factor is usually obtainable. It is well known that the electromagnetic efficiency of a stator is increased as the conductors are placed in the stator slots closer to the bore of the stator. This construction also decreases the depth of the stator slots and thereby requires a smaller diameter stator, resulting in material savings and decreased weight, which is highly desirable in some installations, such as aircraft.

A problem is presented in holding down conductor coil sides in open slot stators during manufacture thereof, including final forming of coil end turns. While the magnet wire which forms the stator coils is generally made of a material, copper or aluminum, having little inherent resiliency, the physical form coil is such that they may eventually force themselves out through the slot opening and cause serious damage to the machine by binding the rotor. Also, during operation of a completed dynamoelectric machine, vibration, and to some extent electromagnetic forces, may tend to force a conductor out of a stator slot into the machine air gap.

It is conventional practice to cover the top conductor in a stator slot to retain the conductor in the slot to prevent contamination from entering the slot and causing a failure by dielectric tracking, and additionally to provide a dielectric barrier between slot conductors and stator iron. The cover, generally referred to as a top stick or wedge, in order to serve these functions, occupies a larger portion of the slot. Top sticks or wedges have heretofore been wedged into the slot with an interference fit; or grooves or slots have been provided in the top portions of the stator teeth forming the slot into which the top stick is secured. The wedging of the top stick into the stator slot within the slot lines may result in cutting the slot lines, ultimately leading to failure due to dielectric tracking. Additionally, it is necessary to tamp, hammer or otherwise force each top stick in its respective slot or slot liner, which is time-consuming. Moreover, providing grooves or slots in the stator teeth to retain the top stick therein decreases the electromagnetic efficiency of the stator and necessitates deepening of the slot.

In the copending application of Roy L. Balke, Serial No. 101,166, filed April 6, 1961, and assigned to the same assignee as the present invention, there is disclosed an improved stator insulation system for open slot stators which eliminates wedged-in top sticks and grooves in stator teeth to receive and retain top sticks therein, and further allows the slot conductors to be closely positioned to the bore to increase the electromagnetic efficiency of the stator. The copending application discloses the use of top sticks selected to have a slip fit in slot liners which they cover, retaining the top sticks within the slot liners while exerting a compressive force thereon to properly seat the slot conductors and top sticks, and through the medium of bonding agents simultaneously securing all top sticks, conductors and slot insulation together and to the stator. This invention may be considered an improvement of that of the aforementioned copending application in the provision of an improved means for securing the contents of each stator together and to the stator.

Accordingly, it is a primary object of this invention to provide an improved stator assembly for open slot stators.

Briefly stated, the invention comprises in one form thereof, in the manufacture of dynamoelectric machines having open stator slots, the provision of inserting top sticks selected to have a slip fit with the slot liners into the slot liners to close the slots, and securing the top sticks, slot liners, and slot conductors together and to the stator by providing an annular bead of bonding or casting material on the outside radial surfaces of the stator core to provide a positive securing means for all contents of the open slots.

The features of the invention which are believed to be novel are set forth with particularity in the appended claims. The invention itself may most easily be appreciated through reference to the following description taken in conjunction with the following drawings wherein:

Figure 1:
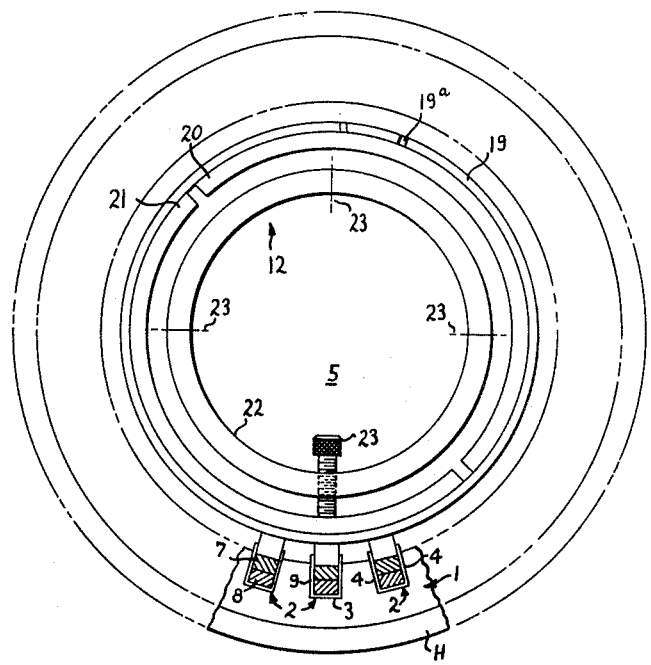
FIGURE 1 illustrates a dynamoelectric machine stator on which the invention may be practiced.
Figure 2:
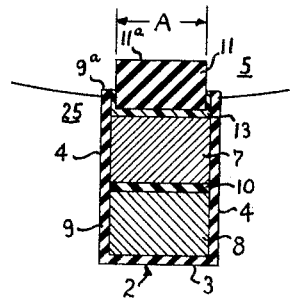
FIGURE 2 is an enlarged view of a slot portion of the stator of FIGURE 1.
Figure 3:
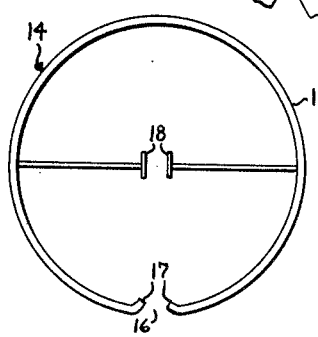
FIGURE 3 illustrates a fixture useful in practicing the invention.

Referring now to the drawings, in FIG. 1 is shown a stator core 1 of a dynamoelectric machine having open slots 2 of rectangular cross-sectional configuration. The slots 2, which are defined by a bottom wall 3 and side walls 4, openly communicate with the slator bore 5, which is arranged to receive a rotor, not shown, therein. The stator core 1, which is carried by a frame or housing member H, may be formed from a stack of laminated punchings of magnetic material. In FIG. 1, only three slots are illustrated in stator core 1; however, it will be understood that the slots 2 are provided about the inner periphery of the stator at predetermined spaced intervals. In the illustrations, each slot 2 (see FIG. 2) contains conductors 7 and 8, illustrated as being of rectangular cross-section, which are the slot portions of stator coils, not fully shown, and a slot liner 9 to provide adequate dielectric insulation between the conductors 7 and 8 and the stator iron. Between the conductors 7 and 8 in the slot liner is inserted an insulating separator 10. Placed on top of conductor 7 within slot liner 9 is top stick 11 of essentially the same length as slot liner 9. In FIG. 1 a radially expandable fixture 12 is illustrated within the bore 5 of stator core 1. The structure and function of this fixture 12 is hereinafter described.

In assembling the above-described stator, the slot liners 9 are inserted in slots 2. In accordance with conventional practice, the slot liners 9 are selected to be slightly longer than the width of the stator core 1 so that the slot liners 9 extend a small distance beyond the stator bore to insulate the conductors 7 and 8 from the stator core where the conductors 7 and 8 leave the bore. The slot liners 9 may be formed to proper size and shape prior to insertion, or may be of a pliable material such as a glass cloth-mica paper-glass cloth laminate in a semi-cured binder which accepts the shape of the slot when inserted therein. The stator coils which provide slot conductors 8 are then positioned in the slot liners 9. The insulating separator 10 is then placed on top of conductor 8 and conductor 7 is positioned in the slot liner on separator 10. Top stick 11 is then applied to the top conductor with a bonding material 13 therein on the surface directed towards slot conductor 7. The top stick 11, which may be laminations of glass cloth in a suitable binder, is selected to have a dimension A such that the top stick has a slip fit within slot liner 9 to facilitate insertion of the top stick 11 therein. Slot liners 9 are preferably formed to have portions 9a extend beyond stator bore 5 to further facilitate positioning of the top sticks therein. The top sticks are further selected to have a dimension in the radius of the stator so that top stick surface 11a extends farther into the stator bore than portions 9a of the slot liners. The length of the top sticks is chosen to be essentially the same as the length of the slot liners.

To facilitate insertion of top sticks 11 into slot liners 9 and retain the loose fitting top sticks therein, a fixture 14 is provided which comprises a hoop 15 of resilient material having a discontinuity 16 therein defined by inwardly dished edges 17. Grips 18 may be urged together to decrease the diameter of hoop 15. In inserting top sticks within the slot liners, the fixture is inserted within the bore 5 and allowed to expand and lightly contact portions 9a of slot liners 9. Top sticks are then inserted into each slot liner through the discontinuity 16 as the fixture 14 is turned within the bore 5. The hoop 15 retains the top sticks already inserted, and the dished edges hallow the hoop 15 to slide over the inserted top stick without knocking it from its slot liner.

The fixture 12 is now inserted into the bore 5 as fixture 14 is withdrawn. The fixture 12 comprises a resilient metallic band 19 having a diagonally directed discontinuity 19a therein to allow radial expansion of band 19. The fixture 12 further comprises members 20 and 21 which are sectors of an annulus positioned within band 19. Positioned within the members 20 and 21 is an annular member 22 having studs 23 screwed threadably extending therethrough into contact with the members 20 and 21. When the studs 23 are screwed into member 22 they will force members 20 and 21 outwardly which radially expands band 19, which compresses top sticks 11 by bearing on surfaces 11a of the top sticks. The force applied to the top sticks to force the conductors to properly seat beneath the bore and the top stick to settle in the bonding material 13.

Figure 4:
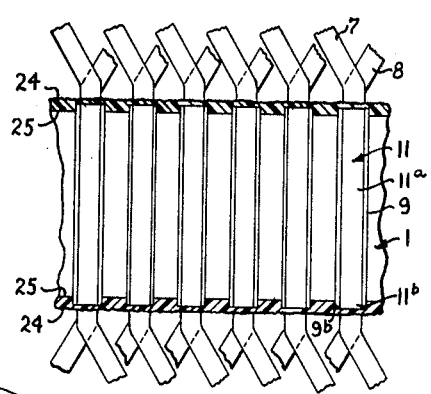
FIGURE 4 shows a developed view of a portion of the stator bore view from inside the bore.

In accordance with the present invention, a second bonding material 24 (see FIG. 4) is then applied to at least one end surface 25 of stator 1, which lies in a radial plane with respect to the longitudinal axis of the stator core. The resin 24 is worked, as by means of a spatula, between the slot liners, conductors of adjacent slots, between conductors of the same slot, between top conductors 7 and top sticks 11 to form an annular bead about at least one of the radial stator surfaces which provides a bead of bonding material which upon cure will simultaneously secure all elements in each slot to a common bond, and to the stator through the common bond. Some of the bonding material 24 will penetrate into the slot liners 11 at the ends thereof to allow a further bond between slot elements. Although not shown in the illustrations, the bonding material 24 may be made to extend over portion 11b of top sticks 11 and portions 9b of slot liners 9.

After the bead of bonding material 24 has been applied, the stator 1 with fixture 12 therein is baked to cure bonding materials 13 and 24. The fixture 12 is then removed from bore 5 and the assembled stator is subjected to the usual varnish impregnation treatment. The bore is then finish machined, which removes the portions of the top sticks and slot liners extending into the bore.

In practicing the invention, I prefer to use as the bonding materials 13 and 24 the epoxy resin compositions disclosed in the copending application of Walter N. Larson and Joseph Rosenberg, Serial No. 55,613, filed September 13, 1960, now Patent No. 3,128,871, and assigned to the same assignee as the present invention. This resin is thixotropic in character and in one form, as described in copending application Serial No. 55,613, is of putty-like consistency, which makes it ideally suited for use as the bonding material 24. However, other bonding materials known to those skilled in the art may be utilized, and the invention should not be considered limited to the one disclosed.

The bonding material 13 may not be required in all cases. The primary purpose of bonding the top stick 11 to the conductor 7 is to insure that the top stick will not be knocked out of its slot liner or partially upset during the finish machining operation on the stator bore. Where the length of the stator is small, the bonding material 24 on one or both of the stator surfaces may be adequate.

It will be seen that the bead of bonding material 24 effectively encapsulates the slot liners, top sticks, and conductors extending from each slot and bonds them to the stator core and to the extending contents of the other slots. With this construction it may be seen that it is not necessary that the bonding material adhere to each individual element extending from the slot.

While I have disclosed the invention in a preferred embodiment thereof, it is intended to cover all changes and modifications of the disclosed embodiment which do not depart from the spirit and scope of the invention.

What I claim as new and desire to secure by Letters Patent of the United States is:

1. In the manufacture of dynamoelectric machines having a stator with open slots therein communicating with the bore of said stator and adapted to receive conductors therein, said stator having surfaces defining the ends thereof, a method of insulating said slots and retaining conductors therein comprising, lining each of said slots with insulating material having portions extending at least to the stator bore, and a small distance beyond said end surfaces, inserting conductors in said slots, closing said slots by inserting insulating top sticks of essentially the same length as said lining means into each of said lining means having a slip fit therewith on top of said conductors and retaining said top sticks therein as successive top sticks are inserted, simultaneously applying a compressive force to the top sticks on the stator bore side thereof to properly seat said conductors and said top sticks in said slots, applying an annulus of bonding material to at least one of said stator end surfaces including said conductors, lining means, and top sticks extending from each slot to secure together and to the stator said conductors, lining means and top sticks.

2. In the manufacture of dynamoelectric machines having a stator with open slots therein communicating with the bore of said stator and adapted to receive conductors therein, said stator having surfaces defining the ends thereof, a method of insulating said slots and retaining conductors therein comprising, lining each of said slots with insulating material having portions extending at least to the stator bore, and a small distance beyond said end surfaces, inserting conductors in said slots, closing said slots by inserting insulating top sticks of essentially the same length as said lining means into each of said lining means having a slip fit therewith on top of said conductors and retaining said top sticks therein as successive top sticks are inserted, simultaneously applying a compressive force to the top sticks on the stator bore side thereof to properly seat said conductors and said top sticks in said slots, and securing the ends extending beyond at least one of said stator end surfaces of said lining means, top stick, and conductor included therein together and to said stator.

3. The slot insulation and conductor retention method of claim 2 wherein bonding material is placed between the conductor and the top stick.

References Cited by the Examiner
UNITED STATES PATENTS

| | | | |
|---|---|---|---|
| 1,538,187 | 5/25 | Herrick | 29—155.5 |
| 2,354,551 | 7/44 | Sawyer | 29—155.5 |
| 2,457,740 | 12/48 | Sigmund et al. | 310—215 |
| 2,569,278 | 9/51 | Barth | 310—214 |
| 2,701,316 | 2/55 | Willits et al. | 310—214 |
| 2,858,462 | 10/58 | Knaus | 310—214 |

JOHN F. CAMPBELL, *Primary Examiner*.

ORIS L. RADER, MILTON O. HIRSHFIELD,
*Examiners.*